116,348

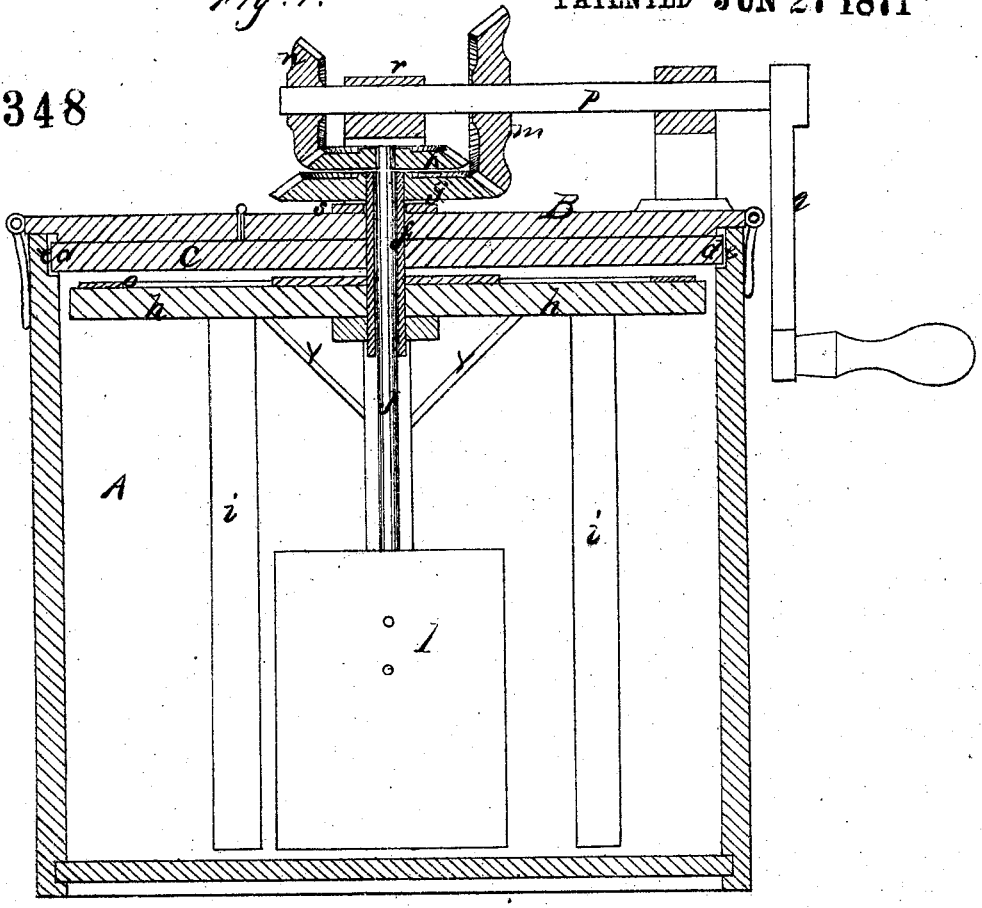
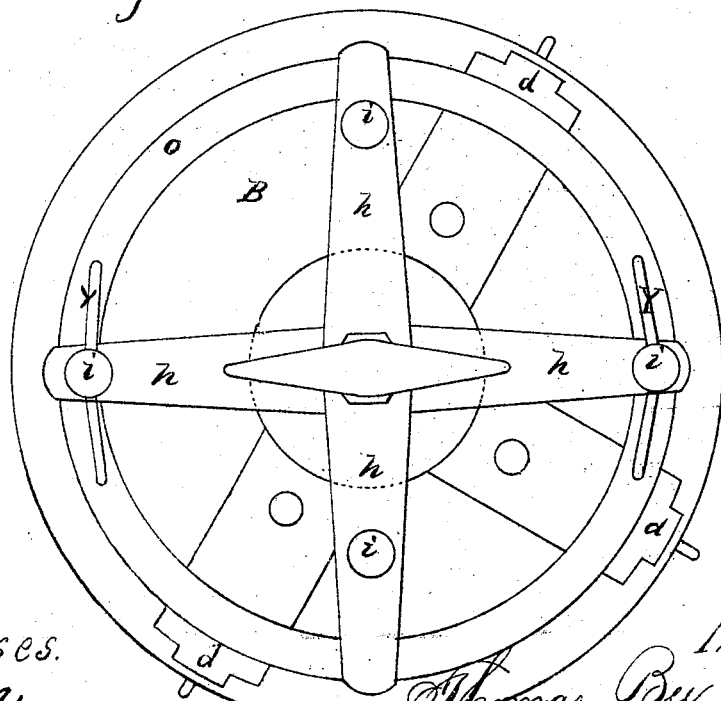

UNITED STATES PATENT OFFICE.

THOMAS BEE PARKE, OF NEAR DOWNIEVILLE, CALIFORNIA.

IMPROVEMENT IN CHURNS.

Specification forming part of Letters Patent No. 116,348, dated June 27, 1871.

*To all whom it may concern:*

Be it known that I, THOMAS BEE PARKE, of near Downieville, county of Sierra, State of California, have invented an Improved Churn; and I do hereby declare the following description and accompanying drawing are sufficient to enable any person skilled in the art or science to which it most nearly appertains to make and use my said invention or improvements without further invention or experiment.

My invention relates to improvements in that class of churns in which two dashers or stirrers are revolved in opposite directions inside of the tub or vessel which contains the cream.

In order to more fully explain my invention, reference is had to the accompanying drawing forming a part of this specification, in which—

A represents the tub or vessel which I employ. Passing vertically through the center of the cover B is a short hollow shaft, $f$, to the upper end of which, above the cover, is fixed a bevel-wheel, $g$, which rests upon the bed-plate $s$ of the central journal-head, while to the end which passes to the lower side of the cover is fixed radiating arms $h$, fastened by screw-nuts, which extend out almost to the sides of the tub when the cover is placed on the churn. Depending from each of the arms $h$ are one or more round sticks of wood, $i$, which serve as agitators or stirrers to churn the cream, and are secured to the arms by tenons, and, extending down, nearly touching the bottom of the churn-tub. These depending stirrers are fixed to the arms at different positions on each arm, so that they shall not follow each other in the same track, but travel in different circles. A flat circular iron brace, O, rests upon the arms $h$, near the ends, securely fastened by screws. Wire braces Y extend from the circular brace O to the stirrers $i$ at an angle of about forty-five degrees. These braces impart great strength to both arms and stirrers, prevent splitting of the arms, &c., as is shown. Passing down through the center of the hollow shaft $f$ is another shaft, $j$, which is provided with a bevel-wheel, $k$, at its upper end. This bevel-wheel is smaller than the wheel $g$ and rests upon it. To the lower end of the shaft $j$ is fixed a single blade, $l$, which extends down so as to almost rest upon the bottom of the churn and even with the lower end of the stirrers. This blade is made tapering each way from its central line to the sides, thus providing four angular faces, as shown, so that as it is revolved the milk or cream is directed and driven by these faces to the sides of the tub, where it will come in contact with the stirrers. The bevel-wheels $g$ and $k$ are driven by the bevel-wheel $m$ and $n$ on the horizontal shaft $p$. The wheel $n$ engages with the small wheel $k$, thus giving to the central vertical shaft $j$ a faster revolution than that communicated by the larger wheels $m$ and $g$ to the hollow shaft $f$ and its arms. A crank, $q$, on the shaft $p$ serves as a means of giving motion to the machine. The difference in the speed of the two shafts allows the outside traveling stirrers to thoroughly divide and agitate the cream, while the revolving blade forcibly drives it to the outside track, where it will receive their action. By the use of the round traveling stirrers I am enabled to agitate the cream more effectually than by the use of any other form, while the entire machine is arranged so as to render it more effective than any churn within my knowledge. In upward of two hundred different trials I have churned butter on an average of about two minutes' time; in one instance nine pounds in ten seconds, and frequently in thirty seconds, of cream from milk which has been heated to about 120°. Cream from milk that has not been heated requires from three to six minutes to churn. It should be heated at a temperature of about 62°.

The idea of constructing this churn was suggested to the mind of the inventor by seeing a woman churning her cream in a common tin milk-pan with a round stick about one foot long and three-quarter inch in diameter. I think the principle of this mode is combined in the construction of my churn.

The central journal-head $r$ is constructed in two parts. The bed-plate $s$ is circular in the middle, upon which rests the bevel-wheel $g$, with an orifice in the center to admit the vertical hollow shaft $f$ to pass through. On opposite sides of the circle are projections for the feet of the journal-head to rest on. These projections are twice the thickness of the center circle. The journal-head $r$ has two legs extending out so as to admit the bevel-wheels $g$ and $k$ to work under them, with feet that rest on the projections of the bed-plate $s$; an orifice in each foot to admit screws, by which they are firmly fastened to the churn-cover B. The horizontal shaft $p$ passes through the journal-head $r$, and projects sufficiently to receive the bevel-wheel $n$. The journal on the upper end of the center vertical shaft $j$, above the bevel-wheel $k$, works in the center of the journal-head $r$, under the horizontal shaft $p$.

I do not claim revolving stirrers in opposite directions, nor do I claim the bevel-gears for giving motion to the vertical shafts; but What I do claim, and desire to secure by Letters Patent, is—

A churn combining in its construction the shaft $j$ and the hollow shaft $f$, revolving in opposite directions and at different rates of speed, the shaft $j$ carrying the four-faced dasher $l$, and the hollow shaft $f$ carrying the arms $h\,h$, secured by the circular brace $o$, and provided with the pendent stirrers $i\,i$, having cylindrical faces, and being supported by the wire braces $y\,y$, when all these parts are constructed and arranged substantially as and for the purpose specified.

In witness whereof I have hereunto set my hand and seal this 2d day of January, A. D. 1871.

THOMAS BEE PARKE. [L. S.]

Witnesses:
ALFRED MARMON,
CHAS. W. GILBERT.